Patented Jan. 13, 1931

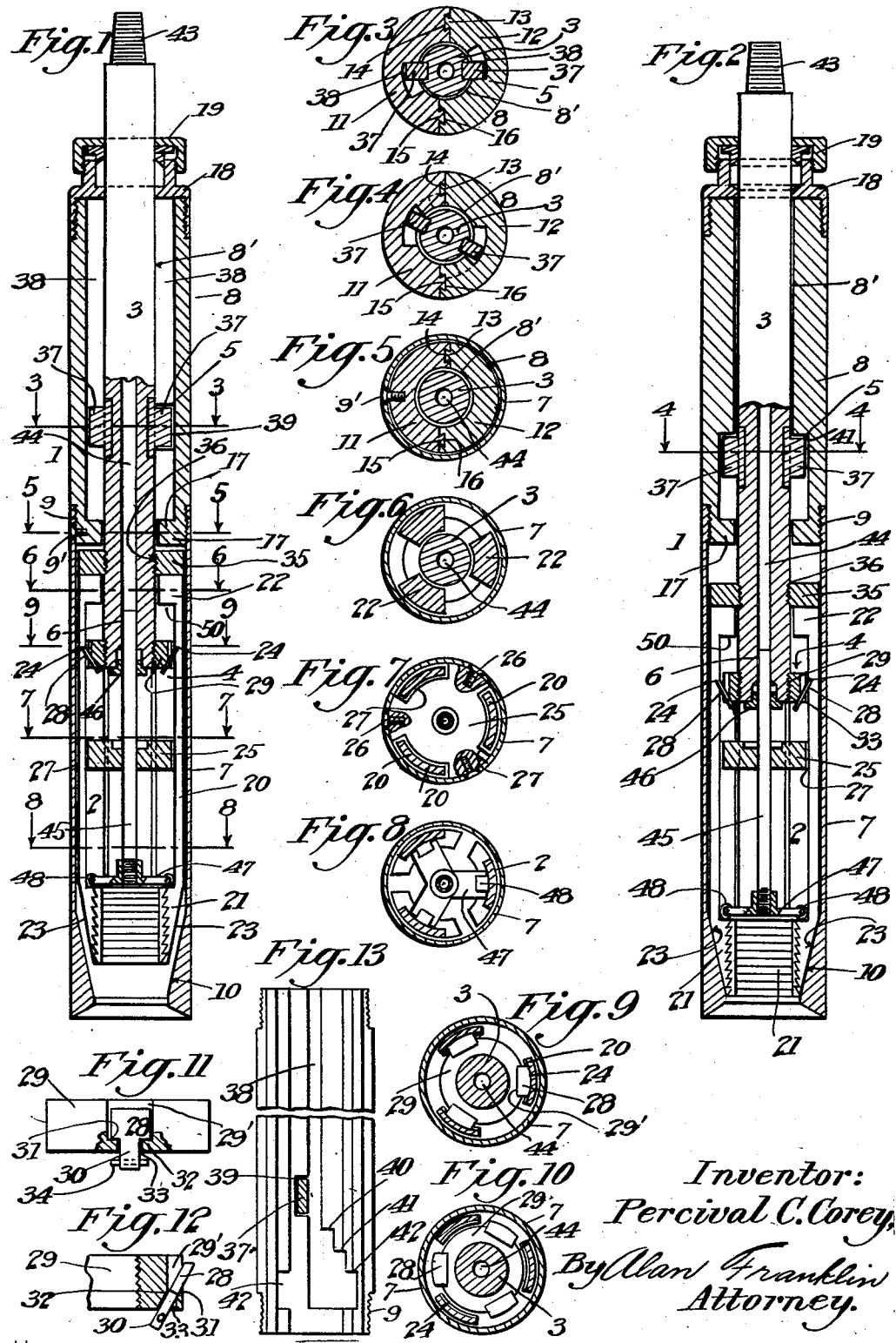

1,788,912

UNITED STATES PATENT OFFICE

PERCIVAL C. COREY, OF LOS ANGELES, CALIFORNIA, ASSIGNOR OF ONE-THIRD TO JOHN C. MASSEY AND ONE-THIRD TO CHARLTON WALLACE, JR., BOTH OF LOS ANGELES, CALIFORNIA

OIL-WELL ROTARY FISHING TOOL

Application filed July 19, 1929. Serial No. 379,414.

This invention relates to oil well fishing tools and the general object of the invention is to provide a fishing tool constructed and arranged to be jarred loose from the "fish" when the "fish" cannot be removed by the tool.

A more particular object is to provide a clutch in a fishing tool of the trip slip socket type, whereby the tool may be jarred loose from the "fish" when it cannot be removed by the tool.

Other objects and advantages will appear hereinafter.

The invention is illustrated in the annexed drawing which forms a part of this specification and in which, Fig. 1 is a vertical longitudinal section of a fishing tool embodying my invention with the slips raised and expanded to slip over the "fish".

Fig. 2 is a longitudinal section of my fishing tool as shown in Fig. 1, with the slips contracted and the slip jaws in gripping position when gripping the fish.

Fig. 3 is a cross section of the tool taken on line 3—3 of Fig. 1.

Fig. 4 is a cross section of the tool taken on line 4—4 of Fig. 1.

Fig. 5 is a cross section of the fishing tool taken on line 5—5 of Fig. 1.

Fig. 6 is a cross section of the fishing tool taken on line 6—6 of Fig. 1.

Fig. 7 is a cross section of the fishing tool taken on line 7—7 of Fig. 1.

Fig. 8 is a cross section of the fishing tool taken on line 8—8 of Fig. 1.

Fig. 9 is a cross section of the tool taken on line 9—9 of Fig. 1 showing the mandrel dogs engaging the slips.

Fig. 10 is a view like Fig. 9 except that the mandrel is shown rotated until the dogs are disengaged from the slips.

Fig. 11 is a view partly in elevation and partly in section of the slip holding means.

Fig. 12 is a fragmentary vertical section of the slip holding means.

Fig. 13 is an inside view of one of the parts of the upper section of the barrel.

Corresponding parts are designated by the same reference characters in all the figures.

My fishing tool includes primarily a barrel 1, slips 2, a mandrel 3, slip holding means 4, a mandrel clutch 5, and washing means 6.

The barrel 1 is made in two sections, a lower tubular shell section 7 and an upper tubular section 8, the upper end of the lower section being screw-seated on the lower end of the upper section by means of threads 9 and the sections are locked against turning by means of a set screw 9'. The lower end of the lower section 7 is formed with an internal conical seat 10 converging downwardly for the purpose hereinafter set forth. The upper section 8 is formed with a bore 8' of such diameter as to provide a loose sliding fit for the mandrel 3 therein and form a bearing for the mandrel, and the section 8 is made in two semi-tubular parts 11 and 12 which are detachably interlocked together by a longitudinal tongue 13 and groove 14 and a longitudinal tongue 15 and groove 16. The lower end of the upper tubular section 8 is formed with an internal annular head 17 through the opening in which the lower portion of the mandrel 3 reciprocates. On the upper end of the upper section 8 of the barrel 1 is screw-seated a cap 18 on which is formed a packing box 19 through which reciprocates the upper end of the mandrel 3.

The slips 2 are each formed with a rein 20, a jaw 21 on the lower end of the rein and a head 22 on the upper end of the rein. The jaws of the slip are each formed with an external inclined surface 23 for engaging the conical seat 10 in the lower end of the barrel 1 for contracting the jaws upon the fish. The reins 20 of the slips are provided with notches 24 for the purpose hereinafter described. A bridge 25 is secured in the lower section 7 of the barrel 1 by screws 26 for the purpose of limiting the distance to which the fish may enter the lower end of the barrel; the bridge being provided with guideways 27 through which the slip reins 20 slide whereby the slips are positioned and guided in the lower section of the barrel.

Dogs 28, for engaging the slip notches 24, are mounted on a collar 29 which is screw-seated on the lower end of the mandrel 3. The dogs 28 are fitted in recesses 29' in the periphery of the collar 29 and are formed with depending tongues 30 and shoulders 31, said shoulders resting upon the lower walls 32 of said recesses and said tongues depending loosely through apertures 33 in said lower recess walls, there being pins 34 extending through the lower ends of said tongues for maintaining the dogs in the collar 29.

A shocking hammer head 35 is screw-seated on the lower portion of the mandrel 3 at 36 for striking against either the slip heads 22 or against the head 17 of the upper barrel section.

The mandrel clutch 5 comprises a pair of lugs 37 extending diametrically outward from the mandrel and adapted to slide in internal longitudinal grooves 38 in the upper section 8 of the barrel 1 and adapted to be turned when the mandrel is turned into notches 39 or into progressively stepped notches 40, 41 and 42 formed in said section and leading from said grooves, for the purpose hereinafter described. The grooves 38 extend through the upper end of the barrel section 8 to receive the lugs 37 so that the mandrel 3 may be introduced into the barrel or removed therefrom through the upper end thereof.

The mandrel 3 is formed with a tapered threaded pin 43 for engaging a threaded box (not shown) on the lower end of a rotary drill stem for lowering the tool into a well. The mandrel 3 is provided with a longitudinal washing bore 44, into the lower end of which extends an extension pipe 45, there being a stuffing box 46 in the lower end of the mandrel through which said pipe extends. On the lower end of the pipe 45 is secured a spider 47 in the arms of which are journaled rollers 48 for engaging the inner surfaces of the slip reins.

The operation of my fishing tool is as follows:

The clutch lugs 37 being engaged with notches 39 and the dogs 28 being engaged with the slip notches 24 and holding the slips 2 elevated (Fig. 1), the tool is lowered into the bottom of a well until the jaws 21 of the slips 2 slip over the "fish" (not shown) in the bottom of the well; the upper end of the "fish" engaging the spider 47 and raising the extension wash pipe 45 and the bridge 25 being adapted to engage the upper end of the fish to limit the downward movement of the tool over the "fish". Water may then be circulated through the mandrel bore 44 and extension pipe 45 around the "fish" to wash the same so that it may be readily gripped by the slip jaws 21. The mandrel 3 is then rotated slightly by the rotary drill tube until the lugs 37 disengage the notches 39 and register with the grooves 38 and the dogs 28 disengage the slip notches 24 (Fig. 9), whereupon the slips 2 and the mandrel 3 drop by gravity until the conical surfaces 23 of the jaws 21, engaging the conical seat 10 in the lower end of the barrel 1, are caused to engage the "fish". The mandrel 3 is then raised slightly and allowed to drop so that the mandrel hammer 35 will strike the slip heads 22 until the jaws 21 are wedged, by the engagement of their conical surfaces 23 with the conical seat 10, into effective gripping engagement with the "fish". The mandrel is then turned until the clutch lugs 37 pass into one of the notches 40, 41 or 42 according to the distance the slips are driven down to grip the "fish", which distance is determined by the outside diameter of the "fish". Upon lifting the mandrel, the lugs 37, engaging the upper edge of one of the notches 40, 41 or 42, will cause the whole tool with the "fish" to be lifted out of the well.

If it should not be possible to remove the "fish", the mandrel may be turned counter-clockwise until the clutch lugs 37 disengage the notches 40, 41 or 42 and register with the grooves 38, and upon lifting the mandrel suddenly so that the collar 29 engages the under sides 50 of the slip heads 22, the slips may be jarred loose and raised in the barrel until the slip jaws release the "fish". The tool may then be raised out of the well upon lifting the mandrel which will engage the mandrel hammer 35 with the head 17 of the barrel 1 and cause the barrel and all parts mounted thereon to be lifted with the mandrel out of the well.

I do not limit my invention to the exact form herein shown and described because it may be embodied in other forms and it is to be understood that in and by the claims of this specification I intend to cover my invention in whatever form it may be embodied.

I claim as my invention:

1. In a fishing tool, a barrel, slips mounted in said barrel, a mandrel mounted in said barrel, a clutch for holding said mandrel elevated in said barrel, slip engaging means on said mandrel for holding said slips elevated, with their jaws expanded to receive the fish, when the mandrel is held elevated by said clutch, means for releasing said clutch and said slip engaging means to allow said slips to drop in said barrel, means for contracting the jaws of the slips to grip the fish when the slips drop in said barrel, a hammer on said mandrel for engaging said slips to drive the jaws against said contracting means into effective gripping position with the fish, and means whereby said clutch may engage the barrel for elevating the tool with the fish gripped thereby.

2. In a fishing tool, a barrel, slips mounted in said barrel, a mandrel mounted in said barrel, a clutch for holding said mandrel elevated in said barrel, slip engaging means on said mandrel for holding said slips elevated, with their jaws expanded to receive the fish, when the mandrel is held elevated by said clutch, means for releasing said clutch and said slip engaging means to allow said slips to drop in said barrel, means for contracting the jaws of the slips to grip the fish when the slips drop in said barrel, a hammer on said mandrel for engaging said slips to drive the jaws against said contracting means into effective gripping position with the fish, and means whereby said clutch may engage the barrel for elevating the tool with the fish gripped thereby and jarring means for jarring and driving said slips upwardly for releasing the slip jaws from the fish when the fish cannot be removed by the tool.

3. In a fishing tool, a barrel formed at its lower end with a conical seat and in its upper portion with longitudinal grooves and notches extending from said grooves, a mandrel slidable through the upper end of said barrel, a clutch including said notches and lugs on said mandrel adapted to slide in said grooves and to engage said notches, slips slidable in the lower portions of said barrel, and engageable at their lower ends with said conical seat for contracting the slip jaws, said slips having notches, dogs on said mandrel for engaging said notches for holding the slips elevated and their jaws contracted when the lugs of said clutch are engaged with certain of said clutch notches extending from said longitudinal grooves, said dogs being arranged to disengage said slip notches when the mandrel is turned to disengage said clutch lugs from said clutch notches and to bring said lugs into register with said longitudinal grooves, a hammer on said mandrel for striking the upper ends of said slips for driving said slips downwardly so that their jaws at their lower ends will be contracted by their engagement with said conical seat to grip the fish when the mandrel is moved up and down with said clutch lugs sliding in said longitudinal grooves, said other clutch notches being arranged to be engaged by said clutch lugs when the mandrel is turned so that the tool may be raised to remove the gripped fish when the mandrel is elevated.

4. In a fishing tool, a barrel formed at its lower end with a conical seat and in its upper portion with longitudinal grooves and notches extending from said grooves, a mandrel slidable through the upper end of said barrel, a clutch including said notches and lugs on said mandrel adapted to slide in said grooves and to engage said notches, slips slidable in the lower portion of said barrel, and engageable at their lower ends with said conical seat for contracting the slip jaws, said slips having notches, dogs on said mandrel for engaging said notches for holding the slips elevated and their jaws contracted when the lugs of said clutch are engaged with certain of said clutch notches extending from said longitudinal grooves, said dogs being arranged to disengage said slip notches when the mandrel is turned to disengage said clutch lugs from said clutch notches and to bring said lugs into register with said longitudinal grooves, a hammer on said mandrel for striking the upper ends of said slips for driving said slips downwardly so that their jaws at their lower ends will be contracted by their engagement with said conical seat to grip the fish when the mandrel is moved up and down with said clutch lugs sliding in said longitudinal grooves, said other clutch notches being arranged to be engaged by said clutch lugs when the mandrel is turned so that the tool may be raised to remove the gripped fish when the mandrel is elevated and jarring means for jarring and driving said slips upwardly to release said jaws from the fish when the fish cannot be removed.

PERCIVAL C. COREY.